AUTOMATIC GAIN CONTROL SYSTEM FOR TELEVISION RECEIVERS

Filed Nov. 14, 1967 2 Sheets-Sheet 1

INVENTOR.
Don G. Rupley
BY
Richard E. Bee
ATTORNEY

United States Patent Office 3,511,930

Patented May 12, 1970

3,511,930

AUTOMATIC GAIN CONTROL SYSTEM FOR TELEVISION RECEIVERS

Don G. Rupley, St. Joseph, Mich., assignor to Heath Company, St. Joseph, Mich., a corporation of Delaware Filed Nov. 14, 1967, Ser. No. 682,835
Int. Cl. H04n 5/52
U.S. Cl. 178—7.3 11 Claims

ABSTRACT OF THE DISCLOSURE

An automatic gain control (A.G.C.) system for use in television receivers. A gated A.G.C. circuit responds to the horizontal sync component in the received television signal to provide reverse A.G.C. control of the first and second stages in the intermediate-frequency amplifier. Gating pulses are obtained from the horizontal deflection circuit output transformer by means of a capacitor voltage divider. A signal inverting A.G.C. amplifier is coupled to the second intermediate-frequency stage for supplying to the radio-frequency amplifier a delayed A.G.C. signal which provides forward A.G.C. control of the radio-frequency amplifier.

Figure 1:
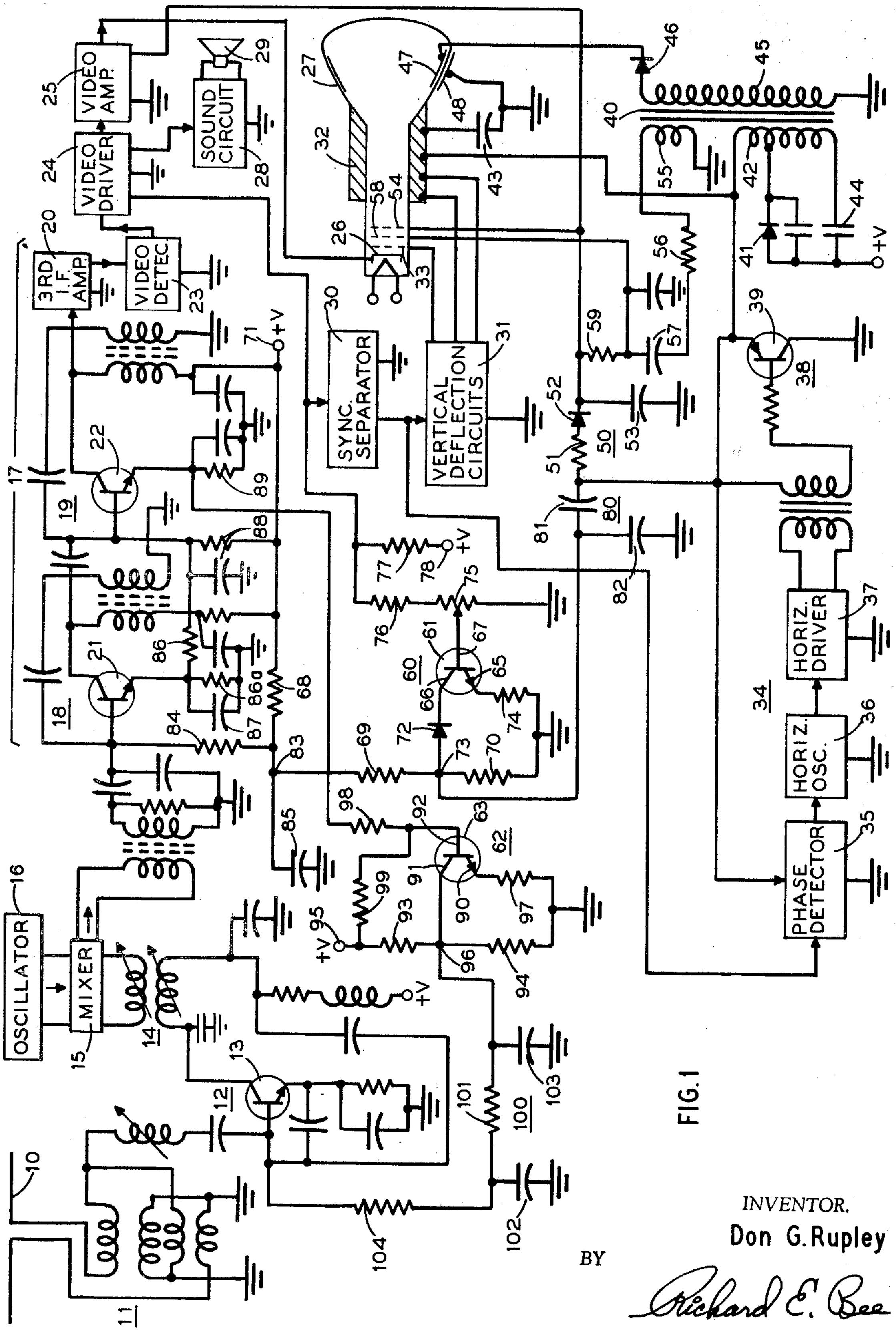

It is an object of the invention to provide a new and improved automatic gain control (A.G.C.) system for use in television receivers.

It is another object of the invention to provide a new and improved high performance automatic gain control system at a relatively low cost.

It is a further object of the invention to provide a new and improved automatic gain control system which provides gated A.G.C. operation with less than the normal number of windings (or winding taps) on the horizontal output transformer.

For an understanding of the present invention, together with other and further objects thereof, reference is had to the following description taken in connection with the accompanying drawings, the scope of the invention being pointed out in the appended claims.

Figure 2:
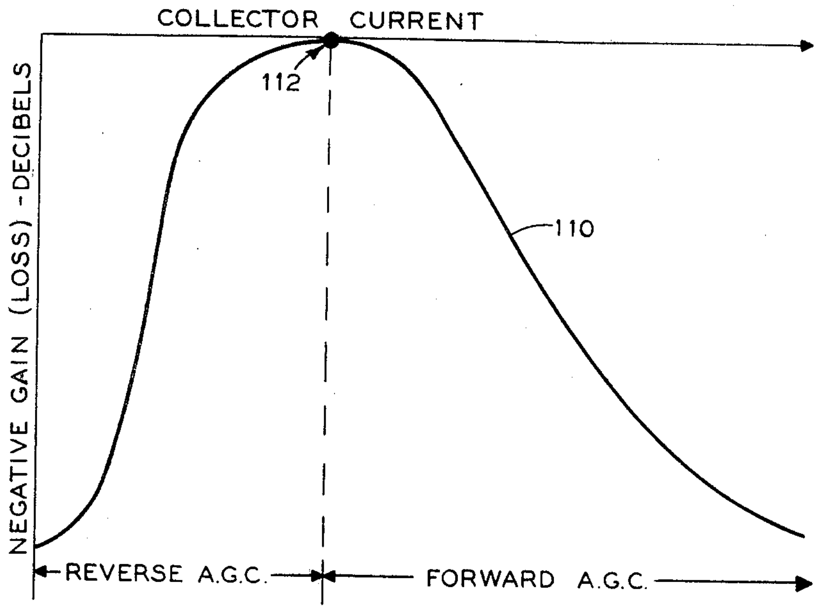

Referring to the drawings:

FIG. 1 is a circuit diagram, partly schematic, of a television receiver including a representative embodiment of an automatic gain control (A.G.C.) system constructed in accordance with the present invention; and FIG. 2 is a graph used to explain the different types of A.G.C. control action employed in the FIG. 1 receiver.

Referring to FIG. 1, the transmitted radio-frequency (R.F.) television signal is intercepted by an antenna system 10 and supplied by way of a balun coil 11 to a radio-frequency amplifier stage 12 which includes a silicon NPN transistor 13. The amplified signal is then supplied by way of a tuner transformer 14 to a mixer circuit 15. The mixer 15 heterodynes the radio-frequency television signal with the high frequency oscillations from an oscillator circuit 16 to develop an intermediate-frequency (I.F.) television signal, the I.F. video carrier being at a frequency of 45.75 megahertz. The I.F. signal is then amplified by an intermediate-frequency amplifier 17 which is comprised of three cascaded amplifier stages 18, 19 and 20. The first stage 18 includes a silicon NPN transistor 21, while the second stage 19 includes a silicon NPN transistor 22. The amplified intermediate-frequency signal is then supplied to a video detector 23. The video component of the detected signal is supplied by way of a video driver 24 and a video amplifier 25 to the cathode 26 of a picture tube 27 for controlling the reproduction of the transmitted television image on the face of the picture tube 27.

The sound component of the detected signal is supplied by way of video driver 24 to sound circuits 28 which drive a loudspeaker 29. The synchronizing ("sync") components of the detected signal are supplied by way of video driver 24 to a sync separator 30 which separates the sync components from the remainder of the video components. Vertical deflection circuits 31 are responsive to the vertical sync components to develop vertical deflection signals which are supplied to the vertical deflection coils of a deflection yoke 32. Vertical circuits 31 also supply vertical blanking signals to a control electrode 33 of the picture tube 27.

A horizontal deflection system 34 is responsive to the horizontal sync components appearing at the output of sync separator 30 for developing horizontal deflection signals for driving the horizontal deflection coils of the deflection yoke 32. The horizontal deflection system 34 includes a phase detector 35, a horizontal oscillator 36, a horizontal driver 37 and a horizontal output stage 38, the latter including a germanium PNP transistor 39 and an output transformer 40. Phase detector 35 compares retrace pulses developed by the output transformer 40 with the horizontal sync component of the detected video signal for purposes of developing a control signal which controls the frequency of the oscillator 36 to keep the horizontal scanning action synchronized with the horizontal video intervals in the received television signal.

The horizontal retrace interval begins when transistor 39 cuts off. The trace current through the horizontal deflection coils of deflection yoke 32 and through a primary winding 42 of output transformer 40 is abruptly halted. The rapid decay of current in the circuit (transistor 39, deflection coils of yoke 32, a capacitor 43 and the primary 42 of transformer 40) causes the circuit to oscillate at approximately 70 kilohertz for one-half of a cycle. This produces a positive retrace pulse of approximately 11 microseconds duration at the emitter of transistor 39.

During the time of the positive retrace pulse, capacitor 43 is charged. At the end of this pulse period, retrace is completed. Capacitor 43 then discharges through the horizontal deflection coils of yoke 32, primary winding 42 and a diode 41, causing a trace on the picture tube 27. A portion of the pulse energy is stored in a capacitor 44, adding to the +V supply voltage (of +12 volts) and producing a boosted voltage of almost twice that value (approximately +22 volts). This boosted voltage serves as the supply voltage for the horizontal output stage 38.

After approximately one-half of the trace interval, transistor 39 is turned on and continues to provide a linear increase of current through the horizontal deflection coils of yoke 32 and the primary winding 42 of the output transformer 40. This continues until another retrace interval is started by the turning off of the transistor 39.

A high voltage secondary winding 45 of the output transformer 40 provides high voltage retrace pulses to a high voltage rectifier circuit formed by a diode 46 and the capacitance between an interior conductive coating 47 and an exterior conductive coating 48 on the flared portion of the picture tube 27. This provides the high accelerating voltage (10,000 volts) for the accelerating electrode represented by the interior coating 47.

The positive retrace pulses appearing across the primary winding 42 of output transformer 40 are supplied to a rectificer circuit 50 which includes a resistor 51, a diode 52 and a capacitor 53. This provides across the capacitor 53 a direct-current voltage of approximately +135 volts which is supplied to a further control electrode 54 in the picture tube 27. This direct-current voltage is also supplied to the video amplifier 25 for enabling such amplifier to provide a proper bias potential for the cathode 26 of the picture tube 27.

Horizontal retrace blanking pulses are developed by a third winding 55 on the output transfromer 40 and are supplied by way of a resistor 56 and a capacitor 57 to a further control electrode 58 of the picture tube 27. A direct-current bias is also applied to such electrode 58 by by of a resistor 59 which is connected to the output of the rectifier 50.

An automatic gain control (A.G.C.) system is provided which includes a first A.G.C. amplifier circuit 60 having a transistor 61 and a second A.G.C. amplifier circuit 62 having a transistor 63. The first A.G.C. circuit 60 is of the gated type and is coupled between the output of the video detector 23 (via video driver 24) and the input of the first I.F. stage 18 for controlling the gain thereof. As will be seen, the A.G.C. signal supplied to the first I.F. stage 18 is passed on to the second I.F. stage 19 for also controlling the gain of that stage. The second A.G.C. circuit 62, on the other hand, is a signal inverting amplifier circuit which is coupled between the output of the second I.F. stage 19 and the R.F. amplifier stage 12 for purposes of supplying an A.G.C. signal to the R.F. amplifier 12 for controlling the gain thereof.

Considering in greater detail the construction of the first A.G.C. amplifier circuit 60, the transistor 61 is of the silicon NPN type and includes an emitter electrode 65, a collector electrode 66 and a control or base electrode 67. Circuit 60 also includes a resistor voltage divider formed by resistors 68, 69 and 70 which are connected in series between a direct-current voltage supply point 71 and chassis ground. A diode 72 is connected between a first intermediate point 73 on the resistor voltage divider and the collector electrode 66. The emitter electrode 65 is connected to chassis ground by way of a resistor 74. The base electrode 67 is connected to the output of the video driver 24 by means of an adjustable potentiometer 75 and a resistor 76. A further resistor 77 is connected between the upper end of the resistor 76 and a direct-current voltage supply point 78.

In order to supply the retrace pulses to the A.G.C. circuit 60 for purposes of gating same, a capacitor voltage divider 80 is coupled between the horizontal output transformer 40 and the A.G.C. circuit 60. Such capacitor voltage divider 80 includes a capacitor 81 connected in series between the first resistor voltage divider point 73 and the primary winding 42 on the horizontal output transformer 40. It also includes a capacitor 82 connected between the circuit 60 side of capacitor 81 and chassis ground.

A second intermediate point 83 on the resistor voltage divider is connected by way of a resistor 84 to the base electrode of the first I.F. transistor 21 for purposes of supplying the A.G.C. signal thereto. A capacitor 85 of relatively large capacitance value is conected between the second intermediate point 83 and chassis ground.

A direct-current signal path is provided between the emitter electrode of the first I.F. transistor 21 and the base electrode of the second I.F. transistor 22 by means of a resistor 86. Capacitors 87 and 88 serve to prevent any of the higher frequency I.F. signal components from traversing this direct-current path.

Considering the details of the second A.G.C. amplifier circuit 62, the transistor 63 thereof is of the silicon NPN type and includes an emitter electrode 90, a collector electrode 91 and a control or base electrode 92. Circuit 62 also includes a resistor voltage divider formed by a resistor 93 and a resistor 94 which are connected in series between a direct-current voltage supply point 95 and chassis ground. An intermediate point 96 on the voltage divider is connected to the collector electrode 91. The emitter electrode 90 is connected to chassis ground by a resistor 97. The base electrode 92 is connected to the emitter electrode of the second I.F. transistor 22 by means of a resistor 98. A resistor 99 is connected between the base electrode 92 and the voltage supply point 95 for purposes of biasing the base electrode 92 to cause relatively heavy collector current flow in the transistor 63 in the absence of any A.G.C. signal.

The collector electrode 91 of transistor 63 is connected to the radio-frequency amplifier circuit 12 by way of a low-pass filter 100 formed by a resistor 101 and capacitors 102 and 103. In particular, the output side of the resistor 101 is connected by way of a resistor 104 to the base electrode of the R.F. amplifier transistor 13.

Considering now the operation of the A.G.C. system, it is helpful to discuss briefly the different types of A.G.C. control action which are used in the R.F. and I.F. amplifier stages. In particular, a reverse A.G.C. control action is applied to the I.F. transistors 21 and 22, while a forward A.G.C. control action is applied to the R.F. transistor 13. The difference between these two types of control action may be seen by reference to the graph of FIG. 2 which shows a plot of collector current versus gain for a typical transistor amplifier stage. In the absence of a received signal, the circuit is biased at a point near the peak of the gain curve 110, such a point being represented at 112. If the reverse A.G.C. control action is to be used, then the effect of the A.G.C. signal is to reduce the magnitude of the collector current as the strength of the received signal increases. As seen from FIG. 2, this reduces the gain of the transistor stage. If, on the other hand, it is desired to use a forward A.G.C. control action, then the effect of the A.G.C. signal is to increase the magnitude of the collector current as the strength of the received signal increases. As seen from FIG. 2, this also reduces the gain of the transistor stage. This occurs because as the transistor is driven into saturation it becomes less and less effective for signal amplification purposes.

Each type of A.G.C. control action has certain advantages and certain disadvantages for different types of application. The use of both types in the present A.G.C. system takes advantage of these differences to provide improved operating performance.

The first A.G.C. amplifier stage 60 is of the gated type. As such, the transistor 61 remains essentially nonconductive except during the occurrence of the positive retrace pulses obtained from the horizontal output transformer winding 42 by way of the capacitor voltage divider 80. During the occurrence of such a retrace pulse, the transistor 61 is turned on. The transistor 61 is then effective to amplify the horizontal sync component of the detected video signal, which component is at that time being supplied to the control electrode 67 of transistor 61 (assuming that the horizontal deflection system has reached a condition of synchronization with the horizontal component in the received signal). The resistor 69 and the capacitor 85 function as a low-pass smoothing filter for purposes of developing at the point 83 a direct-current signal which is proportional to the magnitude of the amplified horizontal sync component appearing at the collector of the transistor 61. This filtered direct-current signal constitutes the A.G.C. signal which is supplied to the base electrode of the first I.F. transistor 21 and subsequently by way of the resistor 86 to the base electrode of the second I.F. transistor 22. As stated, the I.F. transistors 21 and 22 utilize a reverse type A.G.C. control.

The voltage dividing ratio of the capacitor voltage divider 80 is selected to reduce the amplitude of the retrace pulses so that they are sufficient to turn on the transistor 61 but are not so strong as to drive the transistor 61 into saturation.

Following the A.G.C. control action around the loop, if the strength of the received television signal increases, then the amplitude of the horizontal sync component thereof also increases. As a consequence, the amplitude of the horizontal sync component supplied by the video driver 24 to the base electrode 67 of the A.G.C. transistor 61 also increases. This causes the transistor 61 to conduct more heavily during its gated-on intervals. This increases the average collector current flow in the transistor 61 which, in turn, increases the average voltage drop across the resistor 68. This causes the voltage level at the point 83 to become less positive. This makes the direct-current voltage level at the base electrode of first I.F. transistor 21 less positive, thus reducing the average collector current flow through such transistor 21. This reduces the gain of the I.F. transistor 21.

The reduced collector current through transistor 21 reduces the direct-current voltage drop across the resistor 86*a* in the emitter circuit of transistor 21. This, in turn, makes the direct-current voltage level at the base electrode of the second I.F. transistor 22 less positive. This reduces the average collector current flow through such transistor 22. This reduces the gain of the transistor 22. It also reduces the voltage drop across the emitter resistor 89 of transistor 22.

Conversely, when the strength of the received signal decreases, a reverse type of action occurs so as to increase the gain of the two I.F. transistors 21 and 22, up to the limit of their maximum gain. In this manner, there is provided the desired A.G.C. control of the I.F. amplifier 17.

Considering now the operation of the second A.G.C. amplifier 62, the base electrode 92 of the transistor 63 thereof is connected to the emitter of the second I.F. transistor 22. This is a point in the I.F. amplifier circuit where the direct-current level varies with the magnitude of the A.G.C. signal applied to the I.F. amplifier. The A.G.C. transistor 63 is biased so as to be very heavily conductive (well into the saturation region) in the absence of any A.G.C. signal at the base electrode 92. Assuming again the case where the strength of the received television signal is increasing, then the direct-current voltage level at the emitter of the second I.F. transistor 22, and hence the voltage level at the control electrode 92 of the second A.G.C. transistor 63, is becoming less positive. This change is in the direction necessary to reduce the collector current flow through the transistor 63. Such a reduction does not occur immediately, however, because of the fact that the transistor 63 is biased a considerable distance into the saturation region.

In due course, as the voltage level at the control electrode 92 continues to become less positive, the transistor 63 leaves the saturation region and the collector current flow therein begins to decrease. This decreases the voltage drop across the collector resistor 93 which, in turn, increases the positive direct-current voltage level at the collector electrode 91. This increasing direct-current voltage level represents the A.G.C. signal which is supplied by way of the filter 100 to the base electrode of the R.F. transistor 13. This causes the transistor 13 to conduct more heavily. This reduces the gain of such transistor, it being remembered that this transistor 13 is being provided with a forward A.G.C. control action.

The fact that the collector current in the A.G.C. transistor 63 does not begin to change as soon as the voltage level at its control electrode 92 begins to depart from its zero signal value means that the A.G.C. transistor 63 is providing a voltage delay for the A.G.C. control action. In other words, the application of the A.G.C. signal to the R.F. transistor 13 is delayed and the R.F. transistor held at maximum gain until the received signal strength has built up to a desired value. The signal inverting action provided by the A.G.C. transistor 63 (the output A.G.C. level goes more positive as the input A.G.C. level goes less positive) enables a forward A.G.C. signal to be developed from the reverse A.G.C. signal used by the I.F. amplifier stages.

The use of both forward and reverse A.G.C. control enables improved A.G.C. performance. The use of the relatively simple second A.G.C. amplifier circuit coupled between the I.F. and R.F. amplifiers enables this desired performance to be obtained at a relatively low cost. The use of the capacitor voltage divider for coupling retrace pulses from the horizontal output transformer to the gated first A.G.C. circuit serves to reduce the number of windings (or winding taps) required on the horizontal output transformer, thus providing a further construction simplification and cost reduction.

While it is not intended to limit the invention to any particular design constants, the following values have been found suitable for the described A.G.C. system and some of the circuits associated therewith:

Capacitor 81—0.001 microfarads
Capacitor 82—0.005 microfarads
Capacitor 85—2 microfarads
Diode 72—1N191
Resistor 68—68,000 ohms
Resistor 69—47,000 ohms
Resistor 70—22,000 ohms
Resistor 74—47 ohms
Resistor 75—2,000 ohms
Resistor 76—6,800 ohms
Resistor 77—2,200 ohms
Resistor 89—1,500 ohms
Resistor 93—2,700 ohms
Resistor 94—10,000 ohms
Resistor 97—360 ohms
Resistor 98—4,700 ohms
Resistor 99—56,000 ohms
Transistor 13—S 1286
Transistor 21—SE 5023
Transistor 22—SE 5024
Transistor 39—2N3731
Transistor 61—2N3692
Transistor 63—2N3692
Voltage +V—+12 volts D.C.

These circuit values were taken from the assembly manual for the Heathkit Model GR–104 Portable Television Set, published by the Heath Company of Benton Harbor, Mich. Such assembly manual also describes in greater detail the construction of the various circuits shown in block form in FIG. 1, to which reference may be had should such information be desired.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

a first amplifier circuit coupled to the output of the video detector, to the horizontal output transformer and to the intermediate-frequency amplifier and responsive to the horizontal sync component of the video signals during horizontal deflection system retrace intervals for developing and supplying an A.G.C. signal to the intermediate-frequency amplifier for controlling the gain thereof; and a second amplifier circuit comprising a transistor device having an emitter electrode coupled to a point of fixed reference potential, a control electrode coupled to the intermediate-frequency amplifier at a point where the direct-current level varies with the magnitude of the A.G.C. signal and a collector electrode coupled to the radio-frequency amplifier for supplying thereto an A.G.C. signal for controlling the gain thereof.

2. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

- a gated amplifier circuit coupled to the output of the video detector, to the horizontal output transformer and to the intermediate-frequency amplifier and responsive to the horizontal sync component of the video signals during horizontal deflection system retrace intervals for developing and supplying an A.G.C. signal to the intermediate-frequency amplifier for controlling the gain thereof; and
- a signal inverting amplifier circuit coupled to the intermediate-frequency amplifier and to the radio-frequency amplifier and responsive to the A.G.C. action in the intermediate-frequency amplifier for develop- and supplying to the radio-frequency amplifier an A.G.C. signal which varies inversely with respect to the A.G.C. signal supplied to the intermediate-frequency amplifier.

3. In a television receiver having a radio-frequency amplifier having a transistor device, an intermediate-frequency amplifier having a plurality of cascaded transistor devices and a video detector for supplying video signals to a picture tube and having a horizontal deflection system including a horizontal output transformer for supplying deflection signals to the picture tube, an automatic gain control (A.G.C.) system comprising:

- a first amplifier circuit coupled to the output of the video detector, to the horizontal output transformer and to one of the transistor devices in the intermediate-frequency amplifier and responsive to the horizontal sync component of the video signals during horizontal deflection system retrace intervals for developing and supplying to such transistor device an A.G.C. signal which reduces the magnitude of the collector current therein as the magnitude of the received television signal increases; and
- a second amplifier circuit coupled to the intermediate-frequency amplifier and to the transistor device in the radio-frequency amplifier and responsive to the A.G.C. action in the intermediate-frequency amplifier for developing and supplying to the radio-frequency amplifier transistor device an A.G.C. signal which increases the magnitude of the collector current therein as the magnitude of the received television signal increases.

4. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

- a first amplifier circuit coupled to the output of the video detector, to the horizontal output transformer and to the intermediate-frequency amplifier and responsive to the horizontal sync component of the video signals during horizontal deflection system retrace intervals for developing and supplying an A.G.C. signal to the intermediate-frequency amplifier for controlling the gain thereof; and
- a second amplifier circuit comprising a transistor device having emitter, collector and control electrodes, circuit means for connecting the emitter electrode to a point of fixed reference potential, circuit means for biasing the transistor device to cause a relatively heavy collector current flow therein, circuit means for causing the collector electrode voltage level to vary inversely with collector current flow, circuit means for connecting the collector electrode to the radio-frequency amplifier for enabling the collector voltage to control the gain of the radio-frequency amplifier, and circuit means for connecting the control electrode to the intermediate-frequency amplifier for enabling the collector current flow to vary directly with the magnitude of the A.G.C. signal supplied to the intermediate-frequency amplifier when the collector current is between saturation and cutoff conditions.

5. In a television receiver having a radio-frequency amplifier, an intermediate-frequency amplifier having a plurality of cascaded amplifier stages and a video detector for supplying video signals to a picture tube and having a horizontal deflection system including a horizontal output transformer for supplying deflection signals to the picture tube, an automatic gain control (A.G.C.) system comprising:

- a first A.G.C. amplifier circuit coupled to the output of the video detector, to the horizontal output transformer and to the input of one of the earlier stages in the intermediate-frequency amplifier and responsive to the horizontal sync component of the video signals during horizontal deflection system retrace intervals for developing and supplying an A.G.C. signal to such intermediate-frequency amplifier stage for controlling the gain thereof;
- circuit means connected between an output of the earlier intermediate-frequency amplifier stage and the input of a later intermediate-frequency amplifier stage for supplying an A.G.C. signal to such later stage for controlling the gain thereof; and
- a second A.G.C. amplifier circuit coupled to an output of the later intermediate-frequency amplifier stage and to the radio-frequency amplifier for supplying an A.G.C. signal to the radio-frequency amplifier for controlling the gain thereof.

6. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

- a gated amplifier circuit having an input terminal coupled to the output of the video detector and an output terminal coupled to the intermediate-frequency amplifier and responsive, when conductive, to the horizontal sync component of the video signals for developing and supplying an A.G.C. signal to the intermediate-frequency amplifier for controlling the gain thereof;
- capacitor voltage divider means coupled to the horizontal output transformer and to the gated amplifier circuit for supplying thereto retrace pulses for rendering the amplifier circuit conductive during horizontal deflection system retrace intervals; and
- a second amplifier circuit coupled to the intermediate-frequency amplifier and to the radio-frequency amplifier and responsive to the A.G.C. action in the intermediate-frequency amplifier for developing and supplying an A.G.C. signal to the radio-frequency amplifier.

7. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

- a gated amplifier circuit having an input terminal coupled to the output of the video detector and an output terminal coupled to the intermediate-frequency amplifier and responsive, when conductive, to the horizontal sync component of the video signals for developing and supplying an A.G.C. signal to the intermediate-frequency amplifier for controlling the gain thereof;
- a capacitor voltage divider comprising a first capacitor connected in series between the gated amplifier circuit and a winding on the horizontal output transformer and a second capacitor shunting the amplifier circuit side of the first capacitor to a point of fixed reference potential for supplying to the amplifier circuit retrace pulses for rendering the amplifier circuit conductive during horizontal deflection system retrace itnervals; and a second amplifier circuit coupled to the intermediate-frequency amplifier and to the radio-frequency amplifier and responsive to the A.G.C. action in the intermediate-frequency amplifier for developing and supplying an A.G.C. signal to the radio-frequency amplifier.

8. In a television receiver having a radio-frequency amplifier having a transistor device, an intermediate-frequency amplifier having a transistor device and a video detector for supplying video signals to a picture tube and having a horizontal deflection system including a horizontal output transformer for supplying deflection signals to the picture tube, an automatic gain control (A.G.C.) system comprising:

a gated amplifier circuit having an input terminal coupled to the output of the video detector and an output terminal coupled to the transistor device in the intermediate-frequency amplifier and responsive, when conductive, to the horizontal sync component of the video signals for developing and supplying to such transistor device an A.G.C. signal which reduces the magnitude of the collector current therein as the magnitude of the received television signal increases;

capacitor voltage divider means coupled to the horizontal output transformer and to the gated amplifier circuit for supplying thereto retrace pulses for rendering the amplifier circuit conductive during horizontal deflection system retrace intervals; and a second amplifier circuit comprising a transistor device having an emitter electrode coupled to a point of fixed reference potential, a control electrode coupled to the intermediate-frequency amplifier at a point where the direct-current level varies with the magnitude of the A.G.C. signal and a collector electrode coupled to the transistor device in the radio-frequency amplifier for supplying thereto an A.G.C. signal which increases the magnitude of the collector current therein as the magnitude of the received television signal increases.

9. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

a gated amplifier circuit for developing and supplying an A.G.C. signal to the intermediate-frequency amplifier for controlling the gain thereof, such circuit having a transistor device having emitter, collector and control electrodes;

circuit means connecting the emitter electrode to chassis ground;

resistor voltage divider means connected between a direct-current voltage supply point and chassis ground;

a diode connected between a first intermediate point on the resistor voltage divider means and the collector electrode;

circuit means connecting the control electrode to the output of the video detector;

circuit means connecting a second intermediate point on the resistor voltage divider means to the intermediate-frequency amplifier;

a first capacitor connected between the second intermediate point and chassis ground;

a second capacitor connected between the first intermediate point and a winding on the horizontal output transformer;

a third capacitor connected between the first intermediate point and chassis ground; and a second amplifier circuit coupled to the intermediate-frequency amplifier and to the radio-frequency amplifier and responsive to the A.G.C. action in the intermediate-frequency amplifier for developing and supplying an A.G.C. signal to the radio-frequency amplifier.

10. In a television receiver having a radio-frequency amplifier, an intermediate-frequency amplifier and a detector for supplying video signals to a picture tube and having a horizontal deflection system including a horizontal deflection system including a horizontal output transformer for supplying deflection signals to the picture tube, an automatic gain control (A.G.C.) system comprising:

a first A.G.C. amplifier circuit coupled to the output of the video detector, to the horizontal output transformer and to the intermediate-frequency amplifier and responsive to the horizontal sync component of the video signals during horizontal deflection system retrace intervals for developing and supplying an A.G.C. signal to the intermediate-frequency amplifier for controlling the gain thereof;

a second A.G.C. amplifier circuit having a transistor device having emitter, collector and control electrodes;

resistor means connecting the emitter electrode to chassis ground;

resistor voltage divider means connected between a direct-current voltage supply point and chassis ground;

circuit means connecting an intermediate point on the resistor voltage divider means to the collector electrode;

circuit means connecting the control electrode to the intermediate-frequency amplifier at a point where the direct-current level varies with the magnitude of the A.G.C. signal;

circuit means for biasing the control electrode for causing a relatively heavy collector current flow in the transistor device in the absence of any A.G.C. signal; and circuit means connecting the collector electrode to the radio-frequency amplifier for controlling the gain thereof.

11. In a television receiver having a radio-frequency amplifier, an intermediate-frequency amplifier and a video detector for supplying video signals to a picture tube and having a horizontal deflection system including a horizontal output transformer for supplying deflection signals to the picture tube, an automatic gain control (A.G.C.) system comprising:

a first transistor device having emitter, collector and control electrodes;

circuit means conecting the emitter electrode to chassis ground;

resistor voltage divider means connected between a direct-current voltage supply point and chassis ground;

a diode connected between a first intermediate point on the resistor voltage divider means and the collector electrode;

circuit means connecting the control electrode to the output of the video detector;

a first capacitor connected between a second intermediate point on the resistor voltage divider means and chassis ground;

a second capacitor connected between the first intermediate point and a winding on the horizontal output transformer;

a third capacitor connected between the first intermediate point and chassis ground;

circuit means connecting the second intermediate point on the resistor voltage divider means to the intermediate-frequency amplifier for suplying an A.G.C. signal thereto for controlling the gain thereof;

a second transistor device having emitter, collector and control electrodes;

resistor means connecting the second transistor emitter electrode to chassis ground;

second resistor voltage divider means connected between a direct-current voltage supply point and chassis ground;

circuit means connecting an intermediate point on the second resistor voltage divider means to the second transistor collector electrode;

circuit means connecting the second transistor control electrode to the intermediate-frequency amplifier at a point where the direct-current level varies with the magnitude of the A.G.C. signal;

circuit means for biasing the second transistor control electrode for causing a relatively heavy collector current flow in the second transistor device in the absence of any A.G.C. signal; and circuit means connecting the second transistor collector electrode to the radio-frequency amplifier for controlling the gain thereof.

References Cited

UNITED STATES PATENTS 3,361,874 1/1968 Knoebel et al. ------- 178—7.3

ROBERT L. GRIFFIN, Primary Examiner

R. L. RICHARDSON, Assistant Examiner